(12) United States Patent
Hampel-Vogedes

(10) Patent No.: US 6,654,171 B1
(45) Date of Patent: Nov. 25, 2003

(54) IMAGE PROJECTOR

(75) Inventor: Bernhard Hampel-Vogedes, Bremen (DE)

(73) Assignee: STN Atlas Electronik GmbH, Bremen (DE)

( * ) Notice: Subject to any disclaimer, the term of this patent is extended or adjusted under 35 U.S.C. 154(b) by 0 days.

(21) Appl. No.: 09/958,598

(22) PCT Filed: Apr. 14, 2000

(86) PCT No.: PCT/EP00/03379
§ 371 (c)(1),
(2), (4) Date: Oct. 12, 2001

(87) PCT Pub. No.: WO00/65846
PCT Pub. Date: Nov. 2, 2000

(30) Foreign Application Priority Data

Apr. 22, 1999 (DE) .......................................... 199 18 302

(51) Int. Cl.[7] .................. G02B 27/10; G02B 27/14; G03B 21/26; G09B 19/16
(52) U.S. Cl. .................. 359/618; 359/627; 359/629; 353/30; 353/94; 434/44
(58) Field of Search .................. 359/618, 627, 359/629, 636, 639, 259; 353/21, 30, 36, 94; 434/44; 11/32

(56) References Cited

U.S. PATENT DOCUMENTS

| | | | |
|---|---|---|---|
| 4,055,004 A | 10/1977 | Chase | 434/32 |
| 4,145,712 A | 3/1979 | Spooner et al. | 348/757 |
| 4,613,201 A | 9/1986 | Shortle et al. | 372/24 |
| 4,614,941 A | 9/1986 | Jarvis | 345/505 |
| 5,073,830 A | 12/1991 | Loucks | 359/495 |
| 5,485,225 A | 1/1996 | Deter et al. | 348/804 |
| 5,582,518 A | 12/1996 | Henique et al. | 434/44 |
| 6,196,845 B1 * | 3/2001 | Streid | 434/44 |
| 2002/0118375 A1 * | 8/2002 | Ramanujan et al. | 358/1.2 |

FOREIGN PATENT DOCUMENTS

| | | |
|---|---|---|
| FR | 2 445 567 | 7/1980 |
| WO | WO 99/12358 | 3/1999 |

* cited by examiner

*Primary Examiner*—Georgia Epps
*Assistant Examiner*—Timothy Thompson
(74) *Attorney, Agent, or Firm*—Venable LLP; Norman N. Kunitz

(57) ABSTRACT

In an image projector having at least one projection beam that is actuated in the raster mode and in the calligraphic mode for representing a raster component and a calligraphic component of a total image that is projected onto a display, to attain a higher image brightness and a sharper image contrast during projection in non-darkened rooms, the at least one projection beam is a laser beam (19) that is split into two linearly-polarized partial beams (21, 21'), with the two partial beams (21, 21') being subjected to a separate modulation and deflection such that the one partial beam (21') writes the raster component and the other partial beam writes the calligraphic component. The two partial beams (21, 21') are projected simultaneously onto the display; the partial beams may be optically superposed prior to being projected.

13 Claims, 3 Drawing Sheets

IMAGE PROJECTOR

FIELD OF THE INVENTION

The invention relates to an image projector of the generic type defined in the preamble to claim 1.

BACKGROUND OF THE INVENTION

Known CRT image projectors, which operate in raster and calligraphic modes (U.S. Pat. No. 4,614,941), and are generally referred to as raster-calligraphic projectors, are used in, for example, flight simulators for displaying a computer-generated image of the aircraft environment. In raster mode, in which the image is written by horizontal and vertical deflections of the light beam, as in a television image, the actual environment scenario is represented with all of the details, such as the tower, landing strip, houses, roads, trees and the like; the calligraphic mode, in which the light or electron beam can be moved in any direction and at any speed, from non-movement to a high-speed pivot, permits the simultaneous display of the very bright runway lighting and colored regions within the environment scenario, resulting in extremely realistic displays of the airfield and its surroundings, as well as the surrounding landscape.

The light flux of raster-calligraphic CRT projectors is limited by the cathode-ray tube (CRT), and cannot increase significantly, so the image projection for representing a sufficiently bright simulated image is performed in darkened rooms. In raster-calligraphic CRT projectors, the raster component and the calligraphic component of the total image are written one after the other. This limits the image-repetition rate of the projector. If a large number of calligraphically-displayed lights (runway lighting) is displayed, or the image resolution is very high, the raster component must be displayed in an interlaced manner, in which case the lights are represented calligraphically between the two half-images. The use of half-images leads to flickering of the total image.

Laser projectors possessing a considerably higher light flux are used for projecting significantly brighter images that also have adequate contrast and brightness under daylight conditions. Currently, however, these laser projectors can only be operated strictly as raster projectors.

It is the object of the invention to render a raster-calligraphic image projector of the type mentioned at the The light flux of raster-calligraphic CRT projectors is limited by the cathode-ray tube (CRT), and cannot increase significantly, so the image projection for representing a sufficiently bright simulated image is performed in darkened rooms. In raster-calligraphic CRT projectors, the raster component and the calligraphic component of the total image are written one after the other. This limits the image-repetition rate of the projector. If a large number of calligraphically-displayed lights (runway lighting) is displayed, or the image resolution is very high, the raster component must be displayed in an interlaced manner, in which case the lights are represented calligraphically between the two half-images. The use of half-images leads to flickering of the total image.

In a known image projector of the type mentioned at the outset (U.S. Pat. No. 5,582,518), the partial beam that writes the raster component is generated by a CRT, and the partial beam that writes the calligraphic component is generated by a laser. After the two partial beams have been modulated and deflected appropriately, they are guided by a semi-transparent mirror to a fish-eye lens that images the two separate images together on a spherical projection display. In a modified embodiment of this image projector, the CRT is replaced by a second laser, and the two image components of the projected image are written in the calligraphic mode.

In a known arrangement for generating polarized light (U.S. Pat. No. 5,073,830), a non-polarized light beam that is emitted by a light source, e.g., an HeNe laser, is split by a polarization beam splitter into two polarized partial beams having a half-brightness, and whose polarization planes are rotated by 90° relative to one another. The one partial light beam is guided directly to a lens, and the other partial beam is guided to the lens via a 90° deflection mirror and a $\lambda/2$ plate; the lens focuses them onto a common spot. The light source that is formed in this way and radiates polarized light is used for, for example, a video projector having a "liquid-crystal" display.

In a known image projector (WO 99/12358), after the laser beams emitted by the three lasers for the colors red, green and blue are modulated, they are guided with the image content by a light waveguide to a deflection system that images the laser beams on a display.

SUMMARY OF THE INVENTION

It is the object of the invention to render a raster-calligraphic image projector of the type mentioned at the outset laser-capable, so raster-calligraphically-written images can be projected with a much greater brightness.

The object is accomplished by the features of claim 1.

An advantage of the raster-calligraphic image projector in accordance with the invention is that it uses a laser beam as the projection beam, and therefore has a much higher available light flux. Unlike in calligraphic CRT projectors, the splitting of the laser beam into two partial beams allows the raster component and the calligraphic component to be projected simultaneously, so the image-repetition in the raster component is not affected by the number of calligraphically-represented lights. Therefore, high-resolution images having numerous pixels and, simultaneously, a large number of light points, are also projected "non-interlaced." The light points in the calligraphic component can be represented with a far sharper contrast. Their contrast to the raster component results from the longer sojourn of the partial laser beam at the light points relative to the sojourn of the other partial laser beam at a pixel of the raster line. In the use of a beam splitter that splits the two partial beams in a 1:1 ratio, with 1000 pixels per line in the raster component and five light points to be displayed in the calligraphic component, the partial laser beam for the light point remains 1000:5=200 times as long at one position. The maximum contrast for one light point is 200:1. In the display of numerous light points in the calligraphic component, a different splitting ratio can be selected for splitting the laser beam, so the high light flux compensates the shorter sojourn of the partial laser beam at the individual light points. Guiding together the separately-modulated partial beams of different polarities permits a virtually loss-free superposing of the two partial beams in the projection head.

Advantageous embodiments of the image projector in accordance with the invention, and advantageous modifications and embodiments of the invention, ensue from the further claims.

In accordance with an advantageous embodiment of the invention, the polarization directions of the polarized partial beams are rotated 90° relative to one another. The use of differently-polarized partial beams in accordance with the invention permits the virtually loss-free superposing of the two partial beams in the projection head. calligraphic component, the partial beam for the light point remains 1000:5=200 times as long at one position. The maximum contrast for one light point is 200:1. In the display of numerous light points in the calligraphic component, a different splitting ratio can be selected for splitting the laser beam, so the high light flux compensates the shorter sojourn of the partial laser beam at the individual light points.

Advantageous embodiments of the image projector in accordance with the invention, and advantageous modifications and embodiments of the invention, ensue from the further claims.

In accordance with an advantageous embodiment of the invention, the polarization directions of the polarized partial beams are rotated 90° relative to one another. The use of differently-polarized partial beams in accordance with the invention permits the virtually loss-free superposing of the two partial beams in the projection head.

In accordance with a preferred embodiment of the invention, a $\lambda/2$ plate is positioned in the beam path of one of the two partial beams for rotating the polarization directions.

In accordance with a preferred embodiment of the invention, a $\lambda/2$ plate is positioned in the beam path of one of the two partial beams for rotating the polarization directions.

In accordance with a preferred embodiment of the invention, the modulated partial beams are coupled into glass fibers that maintain the beam polarization, and are supplied to a projection head by being coupled back out of the glass fibers, and optically superposed for projection onto a display. This division of the image projector into a laser component and a modulation component, on the one hand, and a projection component, on the other hand, permits a spatial separation of the two components, which is advantageous in an application in a flight simulator, because only the lower-weight projection head must be disposed on the mobile part of the simulator; the weight of the mobile part can therefore be kept low.

The invention is described in detail below by way of an exemplary embodiment illustrated in the drawing. Shown are in:

DETAILED DESCRIPTION OF THE INVENTION

Figure 1:
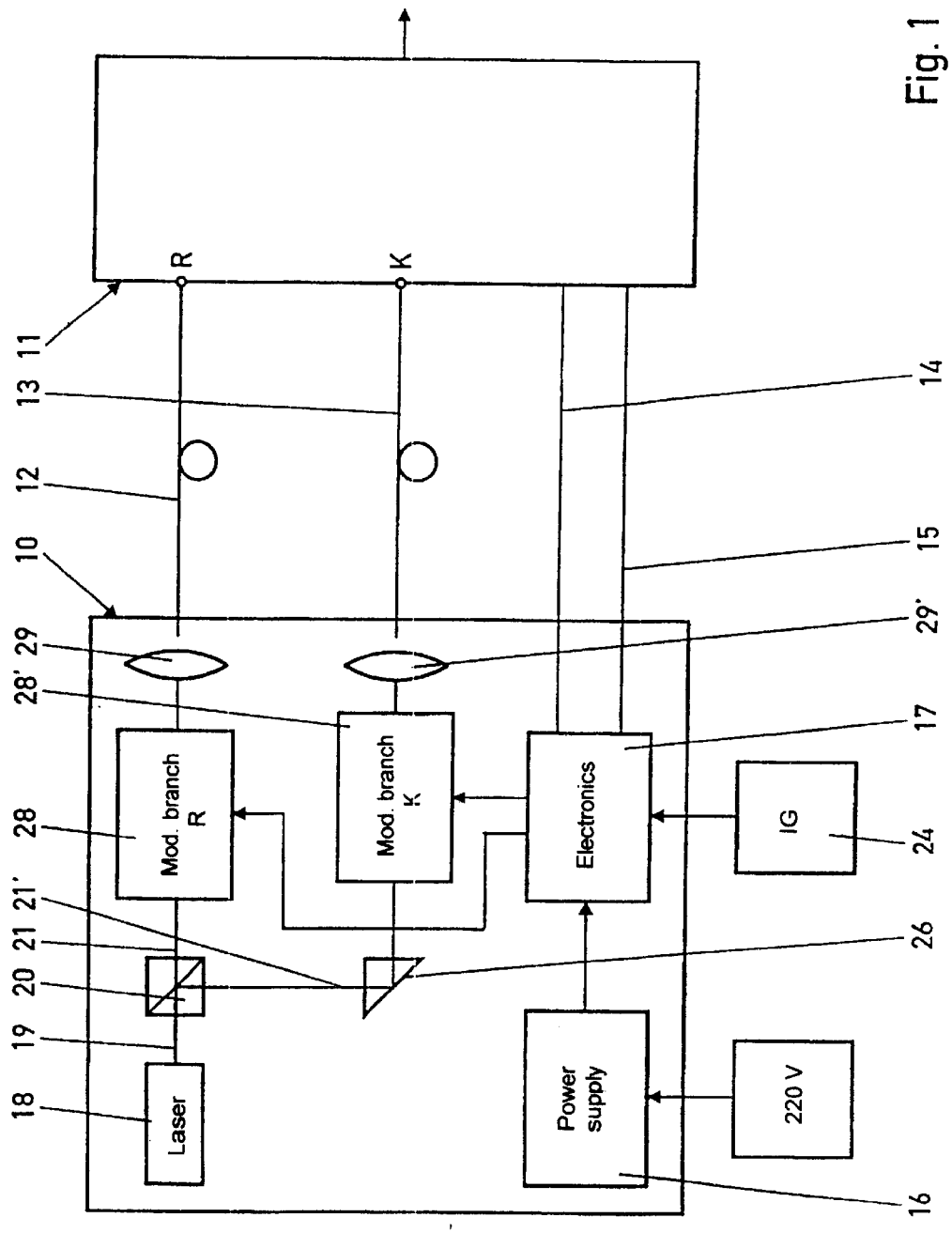
FIG. 1 a block diagram of a raster-calligraphic image projector having a laser and electronics component and a projection head that can be spatially separated therefrom.
Figure 2:
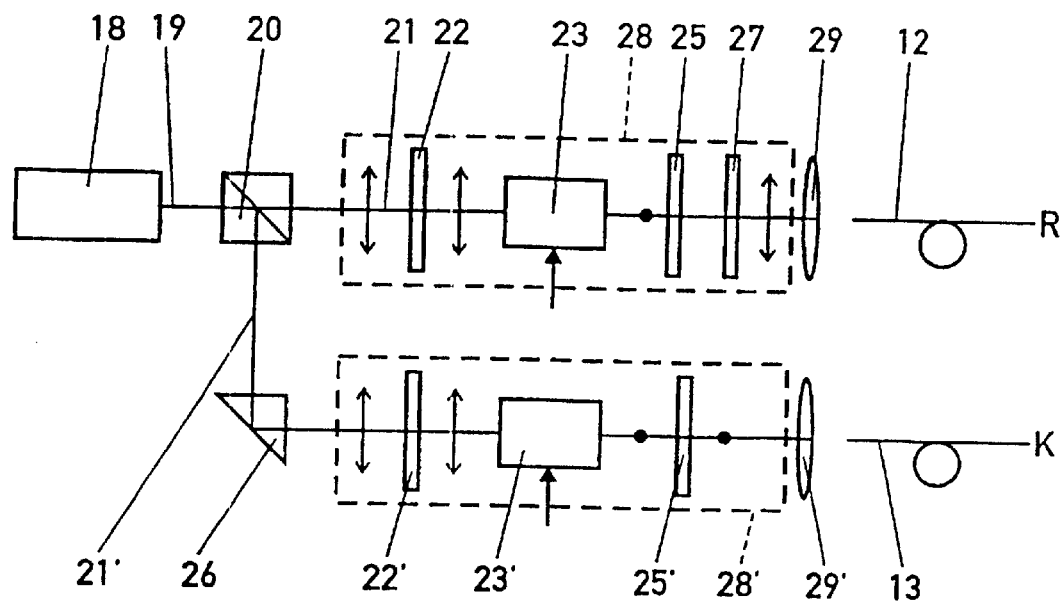
FIG. 2 a schematic, detailed representation of the optical beam paths in the laser and electronics component in FIG. 1.
Figure 3:
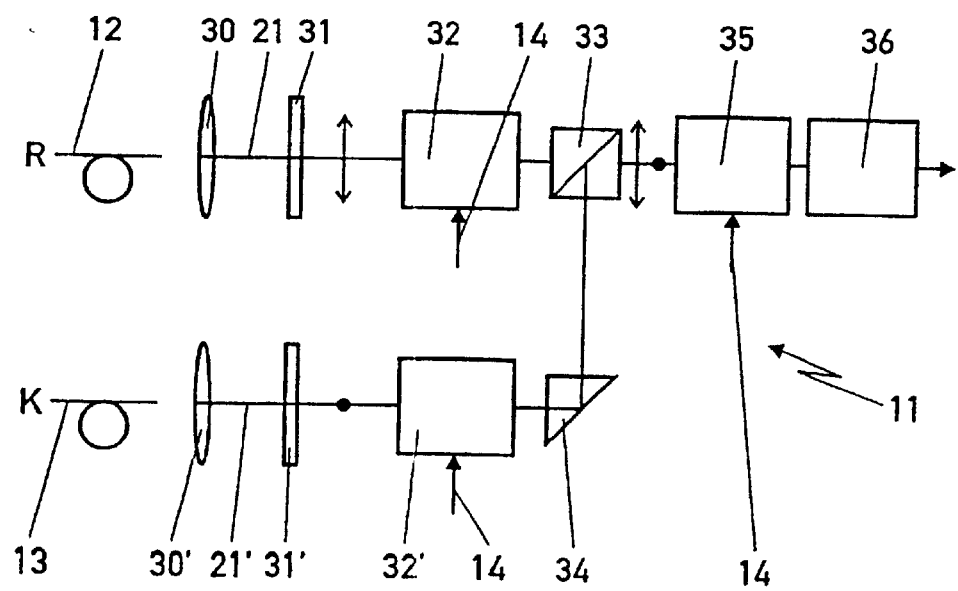
FIG. 3 a schematic, detailed representation of the optical beam paths in the projection head in accordance with FIG. 1.

The image projector shown schematically in FIGS. 1 through 3 has a laser and electronics component 10 and a projection head 11, which can be spatially separated from this component; the two are connected by two glass fibers 12, 13, and a signal line 14 and a current-supply line 15. The laser and electronics component 10 has a power supply 16, which has a 220-Volt current supply, electronics 17 and an optical component that will be described in detail below.

The image projector operates in raster mode and calligraphic mode, with a raster component and a calligraphic component of a total image being generated separately and projected onto a display. The optical component of the image projector is outlined in FIG. 2. A polarized laser beam 19 generated by a laser source 18 is split into two partial beams 21 and 21' in a beam splitter 20. The splitting ratio is preferably 1:1, but a different ratio can be selected for specific applications. Each partial beam 21 and 21' passes through a modulation branch 28 and 28', respectively. The raster component R of the total image is generated with the partial beam 21, while the calligraphic component K is generated with the partial beam 21'. The polarized light of the partial beam 21 first passes through a polarizer 22, whose polarization direction coincides with that of the polarized partial beam 21, and is modulated according to the image content in a downstream electro-optical modulator 23. The double-headed arrows and dots shown in the beam path symbolize the polarization direction or polarization plane of the light. The polarization plane is the plane in which the polarized light oscillates and propagates. In FIGS. 2 and 3, this is the drawing plane, and the plane extending perpendicular to this plane, respectively. The total image to be projected is generated in a so-called image generator 24, which correspondingly controls the electronics 17, which in turn actuates the electro-optical modulator 23 and the electro-optical modulator 23'. The modulators 23 and 23' are configured such that, when the maximum modulation voltage is applied, the polarization plane or polarization direction of the partial beam 21 or 21' rotates by 90°. The modulation is effected such that the maximum voltage is applied to the modulator 23 or 23' for the maximum brightness of a pixel. Disposed behind the modulator 23 is a second polarizer 25, whose polarization plane is oriented perpendicular to that of the first polarizer 22.

The second partial beam 21' of the laser 18' is deflected after the beam splitter 20 with a deflecting prism 26, and fed into the modulation branch 28'. Here, the partial beam 21' passes through the same optical structural component, and in the same manner, as the partial beam 21; corresponding structural components of the modulation branch 28' are therefore provided with the same reference characters and distinguished from the optical structural components in the modulation branch 28 by a prime symbol.

The partial beams 21, 21' exiting the second polarizer 25 and 25', respectively, are linearly polarized in the same polarization plane. To permit a later loss-free, optical superposing of the two partial beams 21, 21' in the projection head 11, the polarization plane of one of the two partial beams, here the partial beam 21, is rotated by 90°, for which purpose a $\lambda/2$ plate 27 is disposed downstream of the polarizer 22. The two modulation branches 28 and 28' for the raster component R and the calligraphic component K of the total image are defined around this $\lambda/2$ plate 27. Each partial image 21 or 21' is coupled into one of the two glass fibers 12, 13 by way of an optical coupling optics 29 or 29'.

Each glass fiber 12, 13 is connected to an optical coupling optics 30 or 30' in the projection head 11 (FIG. 3). Each partial beam 21 or 21' coupled out of the glass fiber 12 or 13 passes through a polarizer 31 or 31', which serves to suppress any rotations of the polarization planes of the partial beams 21, 21' that may be experienced in the glass fibers 12, 13, and to unambiguously define the polarization plane. The partial beam 21 is deflected horizontally in a deflection unit 32 or a scanner. This deflection corresponds to the line deflection of the partial beam 21, and is performed with a correspondingly-high deflection frequency.

One possible embodiment of the deflection unit 32 is in the form of a rapidly-rotating polygonal mirror. Another possible embodiment of the deflection unit 32 is as a micro-optical mirror. The partial beam 21', which is coupled out of the glass fiber 13 and is responsible for the calligraphic component K, passes through the same polarizer 31' for the same purpose, and is deflected horizontally in a deflection unit 32'. In contrast to the line deflection of the raster component, the horizontal deflection of the calligraphic component can be effected slowly within a line for the light points.

One possible embodiment of the deflection unit 32' is an electroplated mirror that is operated such that it approaches each light point within the line in quick succession. In the process, it writes the lines alternately from left to right and from right to left. This avoids a rapid return. Another possible embodiment of the deflection unit 32' for horizontally deflecting the partial beam 21' is, for example, a micro-optical mirror. The electronics 17 controls the two deflection units 32 and 32' via the signal line 14.

After the deflection units 32, 32', the two partial beams 21 and 21' are superposed in a polarization beam splitter 33, for which purpose a deflection prism 34 has already deflected the partial beam 21' to the polarization beam splitter 33. The superposed partial beams 21, 21' are deflected vertically in a further deflection unit 35. An electroplated mirror is preferably used for this procedure. The mirror changes its angle by a small increment for each line. After each image, it returns to its initial position. Instead of an electroplated mirror, however, it is also possible to use a different deflection unit 35 that performs the same action, such as a micro-optical mirror. This deflection unit 35 is also controlled by the electronics 17 via the signal line 14. The projection lens 36 projects the generated raster-calligraphic image onto the display or another projection surface.

Figure 4:
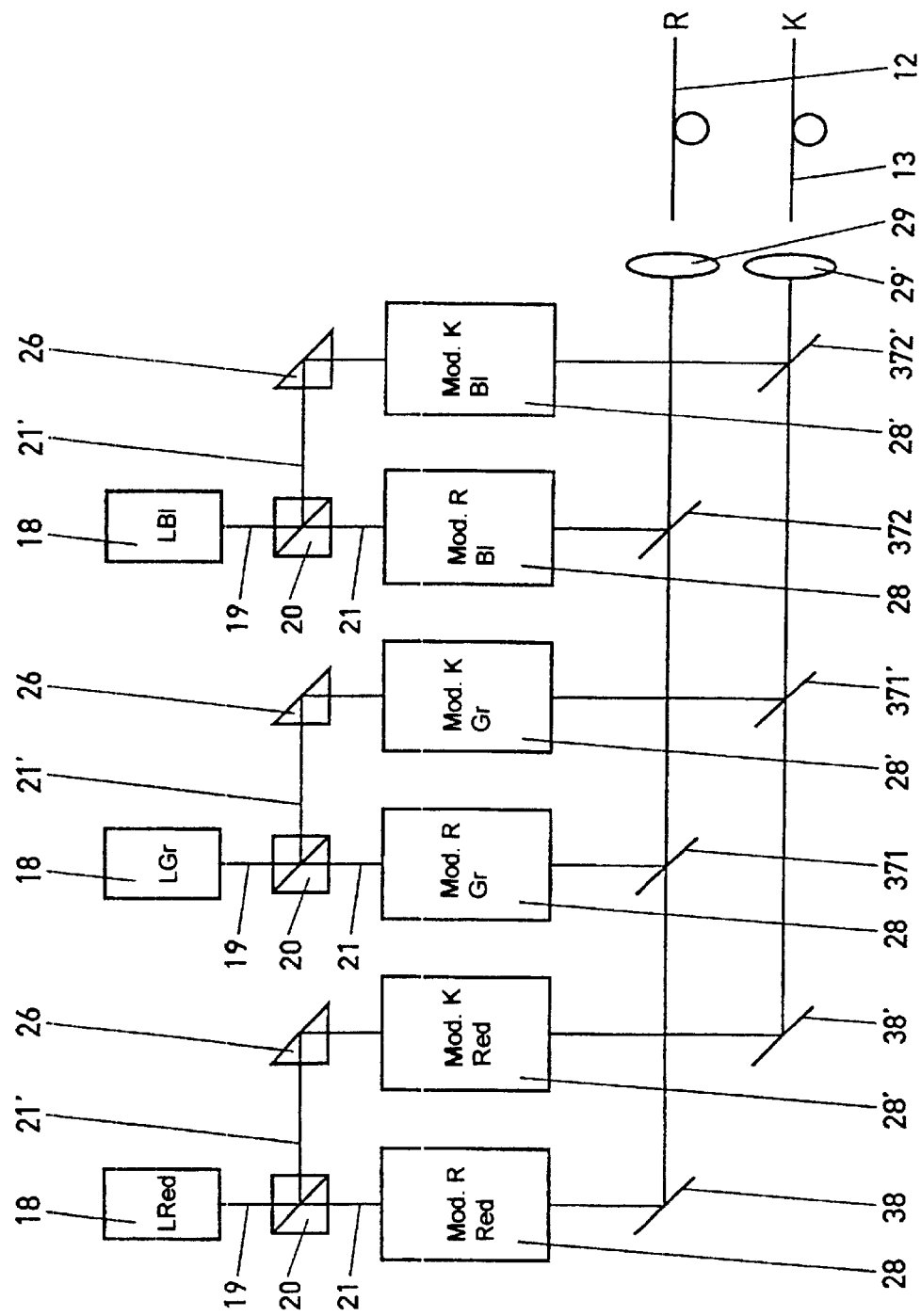
FIG. 4 a schematic, detailed representation of the optical beam paths in the laser and electronics component in a color projector.

According to the above-described principle of separate light modulation for the raster component and the calligraphic component, a monochromatic image having n gray stages is obtained in the color of the laser generated by the laser source 18. The generation of color images requires three laser sources 18 having lasers of different wavelengths, as shown in FIG. 4. Each laser source 18 emits light in the red, green and blue spectral range. The wavelengths can be, for example, 629 nm, 532 nm and 446 nm. Each laser beam 19 of the three laser sources 18 is split into the two partial beams 21 and 21', as described in conjunction with FIG. 2, and passes through the modulation branch 28 or 28'. Prior to being coupled into the glass fibers 12, 13, the partial beams 21 of all three laser beams 19 that write the raster component, and the partial beams 21' of all three laser beams 19 that write the calligraphic component, are optically superposed with the aid of dichroic mirrors 37, 37'. The dichroic mirrors 37, 37' have different transmissions and reflections in the three spectral ranges of red, green and blue. The dichroic mirrors 371 and 371' have a high transmission for red and a high reflection for green, and the mirrors 372 and 372' have a high transmission for red and green and a high reflection for blue. Only simple deflection mirrors 38 and 38' are necessary for coupling in the partial beams 21 and 21' in the red spectral range.

After the beams have been coupled into and out of the glass fibers 12, 13 in the projector head 11, the course of the beam paths of the partial beams 21 and 21' is as described in conjunction with FIG. 3.

What is claimed is:

1. An image projector having at least one projection beam that is actuated in the raster mode and the calligraphic mode for displaying a raster component and a calligraphic component of a total image that is projected onto a display, the beam comprising two partial beams (21, 21') that were superposed prior to the image projection and are simultaneously projected onto the display, and are subjected to a separate modulation and deflection such that the one partial beam (21) writes the raster component and the other partial beam (21') writes the calligraphic component, characterized in that the partial beams (21, 21') are two linearly-polarized laser beams that are generated by the splitting of a laser beam (19), and have polarization directions or planes that are rotated by 90° relative to one another, and a polarization beam splitter (33) is provided for superposing the partial beams (21, 21').

2. The projector according to claim 1, characterized in that the superposed partial beams (21, 21') are guided via a projection lens (36) and a vertically-deflecting deflection unit (35), preferably an electroplated mirror, that is disposed in front of the projection lens (36).

3. The projector according to claim 1, characterized in that, for splitting the laser beam (19), the beam is guided by way of a beam splitter (20), and each partial beam (21, 21') passes through the same polarizer (22, 22').

4. The projector according to claim 1, characterized in that an optical modulator (23, 23'), through which each partial beam (21, 21') passes, is embodied such that, with the maximum modulation voltage, it rotates the polarization direction or plane of the incident, polarized partial beam (21, 21') by 90°; a polarizer (25, 25') is disposed downstream of the modulator (23, 23'), with the polarization direction or plane of the polarizer being rotated by 90° relative to that of the polarized partial beam (21, 21') that is incident at the modulator (23, 23'); and the modulator (23, 23') is actuated such that the maximum voltage is applied to the modulator (23, 23') for maximum pixel brightness.

5. The projector according to claim 4, characterized in that the polarization directions or planes of the two partial beams (21, 21') are rotated in the beam path after the modulators (23, 23'), preferably by an optical component (27) that is disposed in the beam path of one partial beam (21) and rotates the polarization direction or plane of the incident, polarized partial beam (21) by 90°.

6. The projector according to claim 5, characterized in that the optical component is a λ/2 plate (27), which is preferably located directly behind the polarizer (25) disposed downstream of the modulator (23).

7. The projector according to claim 1, characterized in that each modulated partial beam (21, 21') is coupled into a polarization-maintaining glass fiber (12, 13) by means of an optical coupling optics (29, 29'), and fed into a projection head (11) by way of the glass fiber (12, 13).

8. The projector according to claim 7, characterized in that each glass fiber (12, 13) is connected to one of two coupling optics (30, 30') disposed in the projection head (11); the partial beam (21) that exits the coupling optics (30) and writes the raster component is guided via a deflection unit (32), preferably a rotating polygonal mirror, that deflects the partial beam (21) horizontally with a high deflection frequency; and the partial beam (21') that exits the coupling optics (30') and writes the calligraphic component is guided via a deflection unit (32'), preferably an electroplated mirror, that deflects the partial beam (12') horizontally with a low deflection frequency.

9. The projector according to claim 8, characterized in that the deflection unit (32') for the partial beam (21') that writes the calligraphic component is embodied such that all of the light points to be displayed within a line that is established by the maximum horizontal deflection are actuated in quick succession.

10. The projector according to claim 9, characterized in that the deflection unit (32') is embodied such that the horizontal deflection direction is opposite in consecutive lines.

11. The projector according to claim 8, characterized in that a polarizer (31, 31') is disposed downstream of each coupling optics (30, 30').

12. The projector according to claim 7, characterized in that three projection beams are provided for generating a total image in color, with one projection beam being a laser beam (19) in the green spectral range, one being a laser beam (19) in the red spectral range and one being a laser beam (19) in the blue spectral range; and before the partial beams (21, 21') are coupled into the glass fibers (12, 13), the partial beams (21) of all three laser beams (19) that write the raster component, and the partial beams (21') of all three laser beams (19) that write the calligraphic component, are optically superposed.

13. The projector according to claim 12, characterized in that dichroic mirrors (37, 37') having different transmissions and reflections in the three spectral ranges are provided for superposing the three respective partial beams (21, 21').

* * * * *